Figure 1:
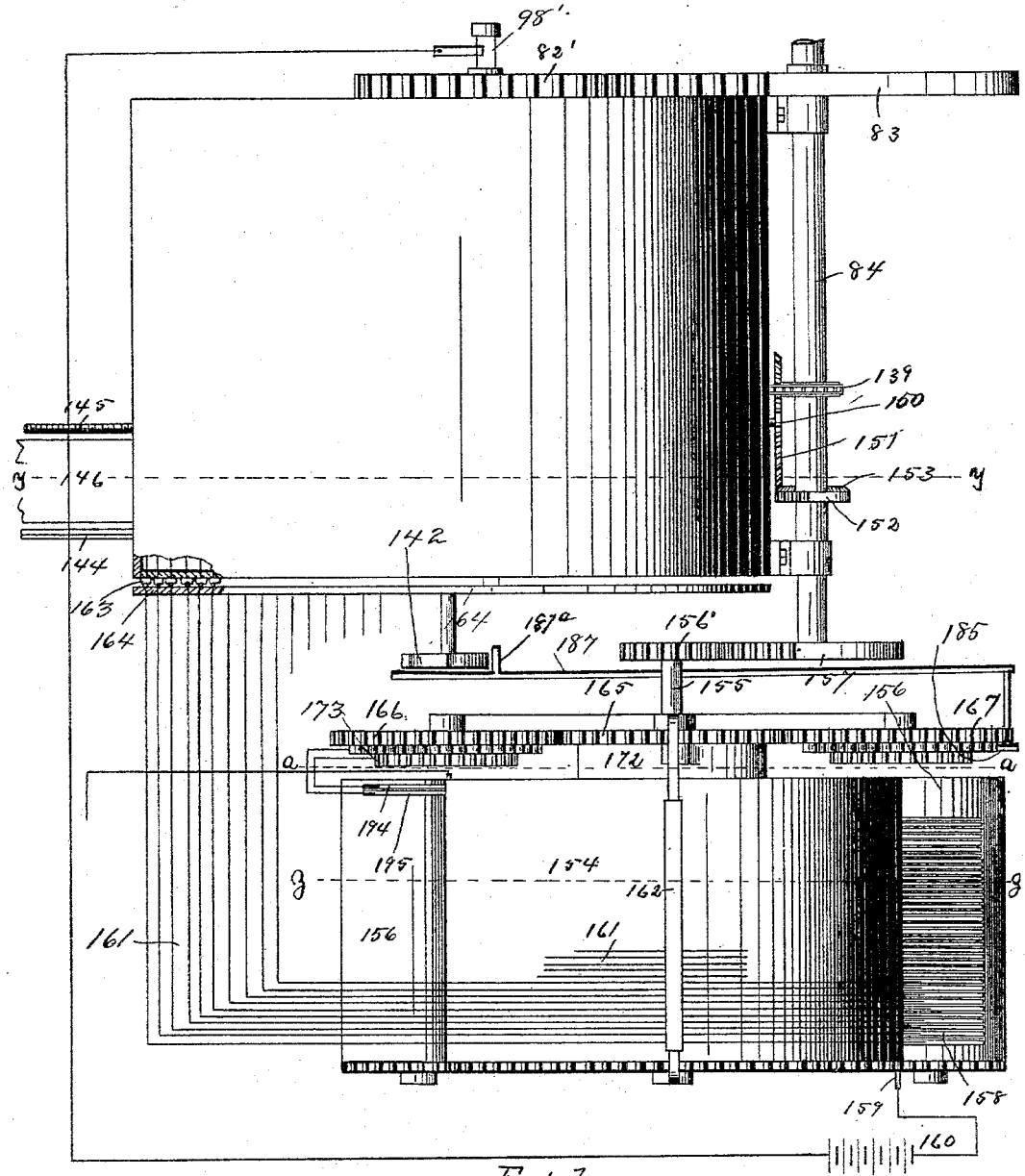

(No Model.)
10 Sheets—Sheet 1.

E. V. BEALS.
MATRIX MAKING MACHINE.

No. 490,263. Patented Jan. 24, 1893.

WITNESSES.
Carroll J. Webster
Floyd R. Webster

INVENTOR.
Erle V. Beals
By William Webster
Atty

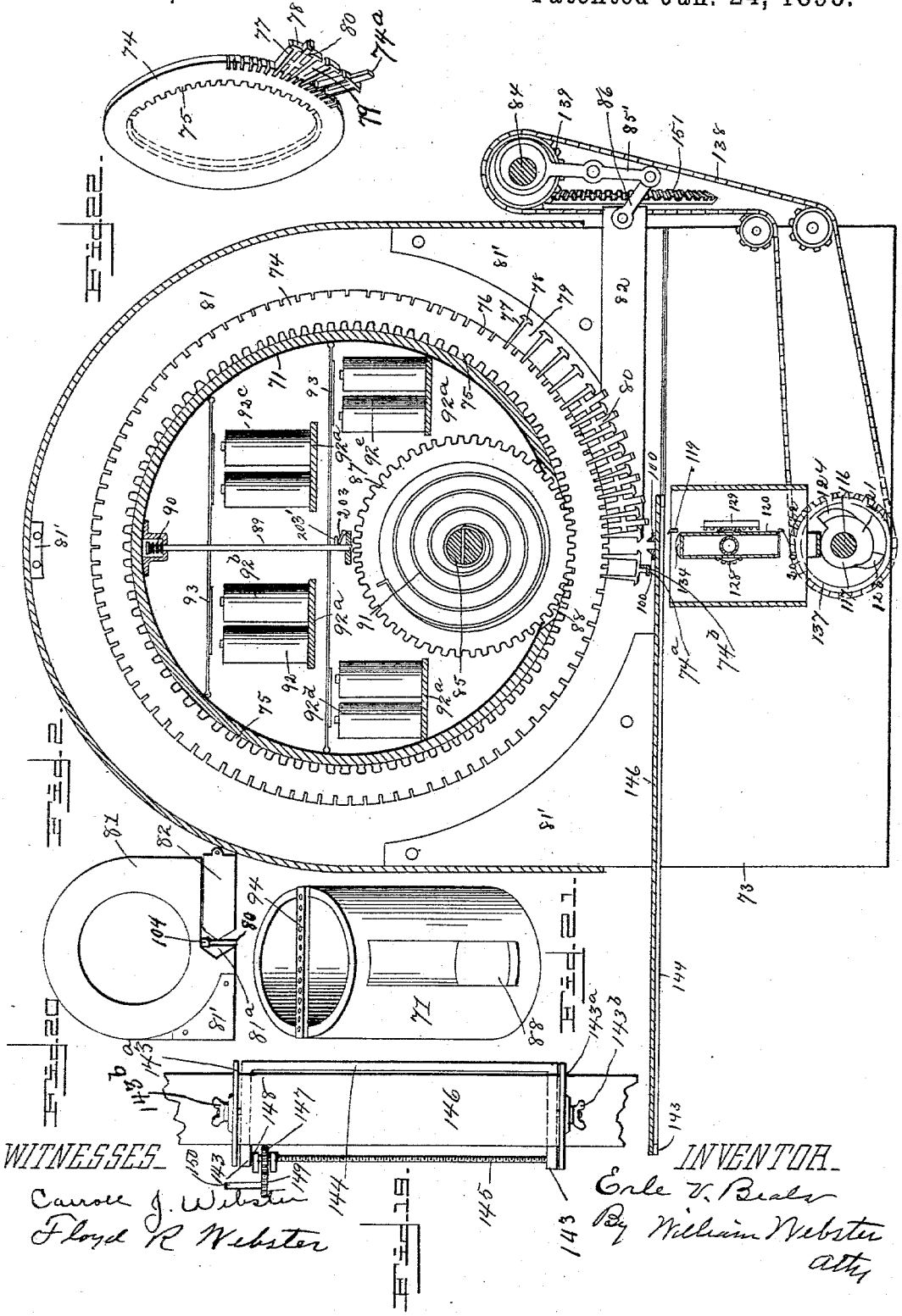

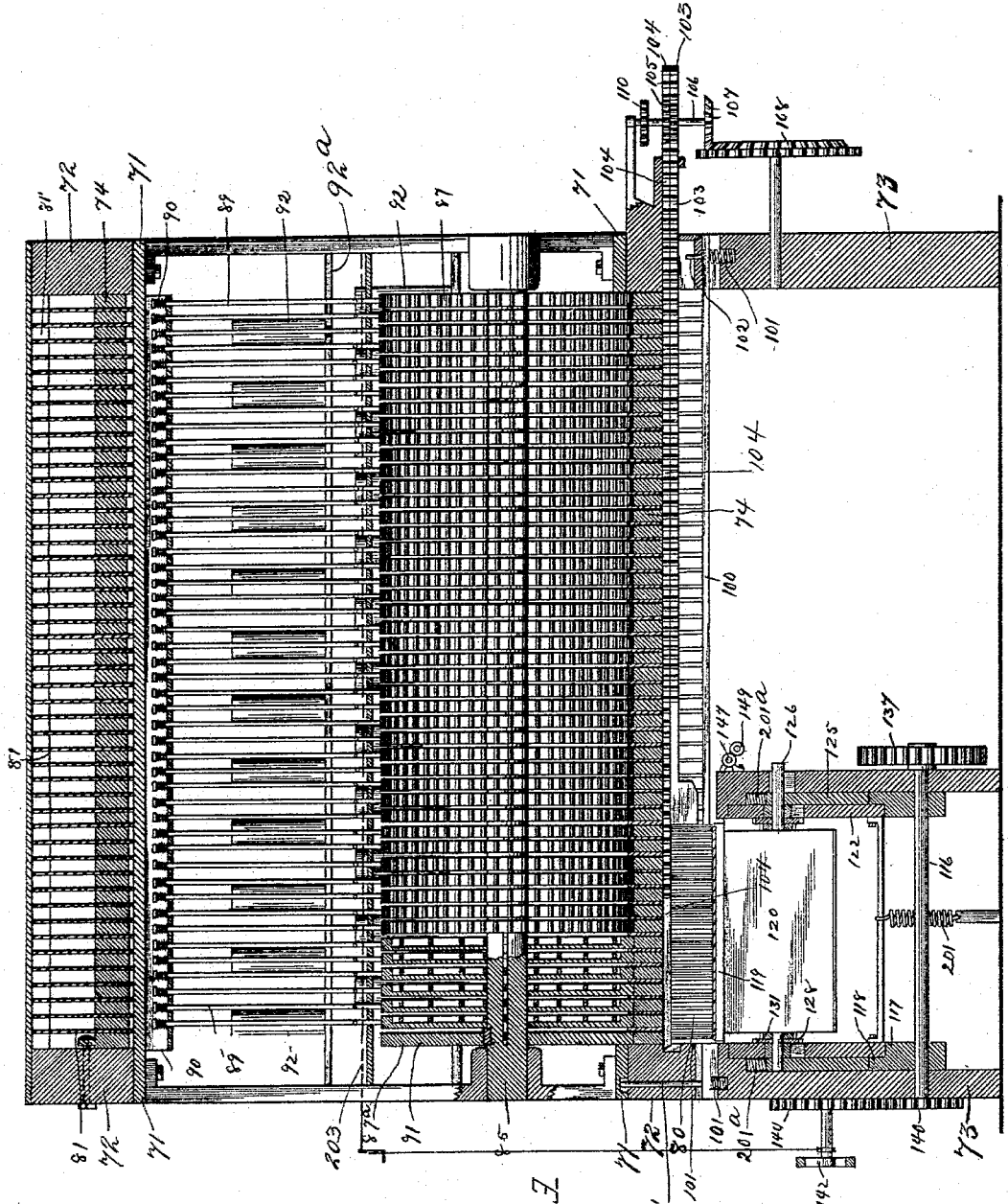

(No Model.) 10 Sheets—Sheet 4.
E. V. BEALS.
MATRIX MAKING MACHINE.
No. 490,263. Patented Jan. 24, 1893.
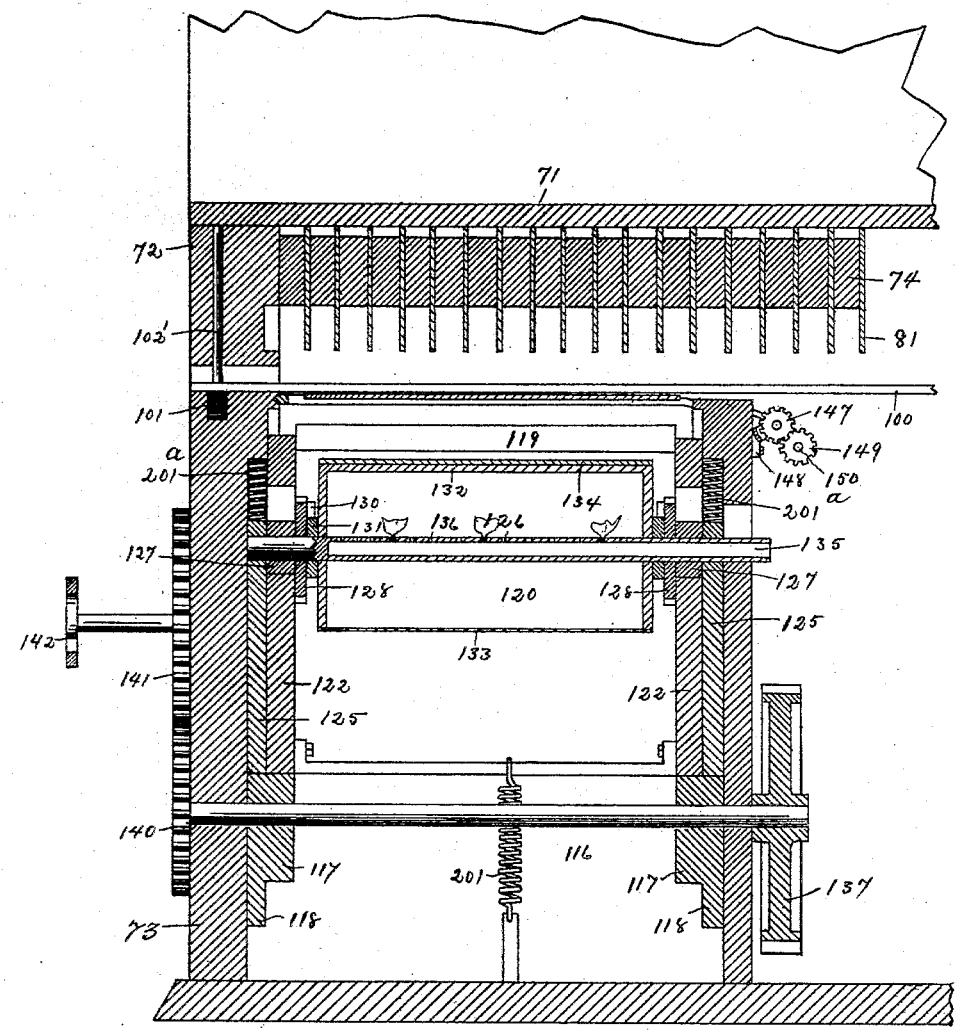
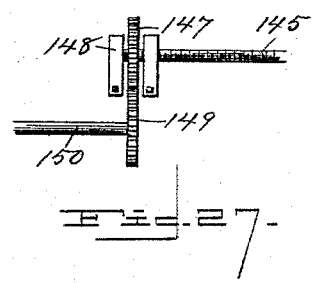
WITNESSES
Carroll J. Webster
Floyd R. Webster
INVENTOR
Erle V. Beals
By William Webster
atty.

(No Model.)  
E. V. BEALS.  
MATRIX MAKING MACHINE.  
No. 490,263.  
Patented Jan. 24, 1893.  
10 Sheets—Sheet 5.
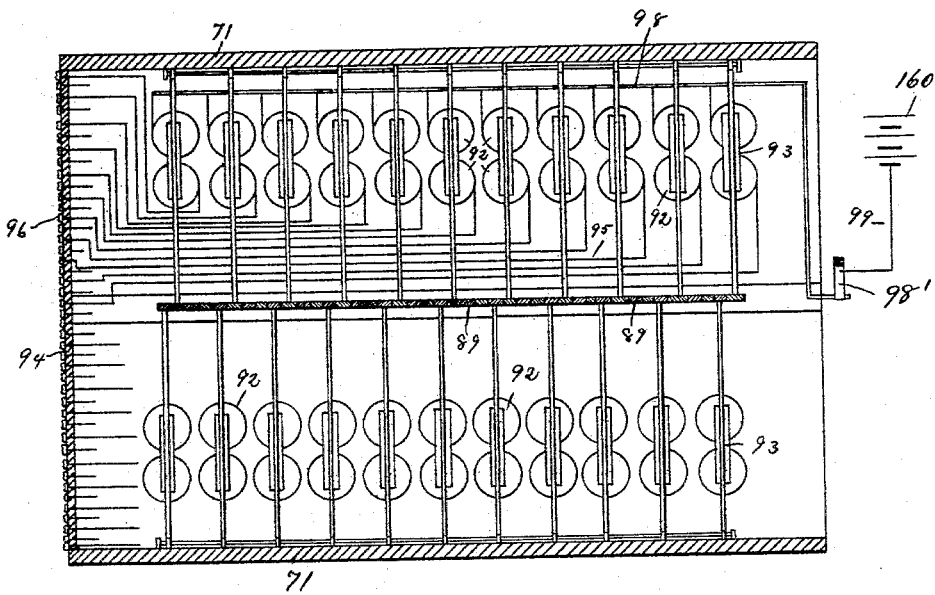
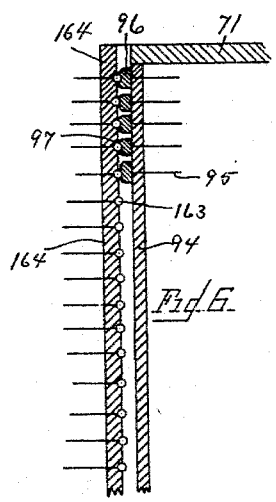
WITNESSES  
Carroll J. Webster  
Floyd R. Webster  
INVENTOR  
Erle V. Beals  
By William Webster  
Atty (No Model.)  10 Sheets—Sheet 6.
E. V. BEALS.
MATRIX MAKING MACHINE.
No. 490,263. Patented Jan. 24, 1893.
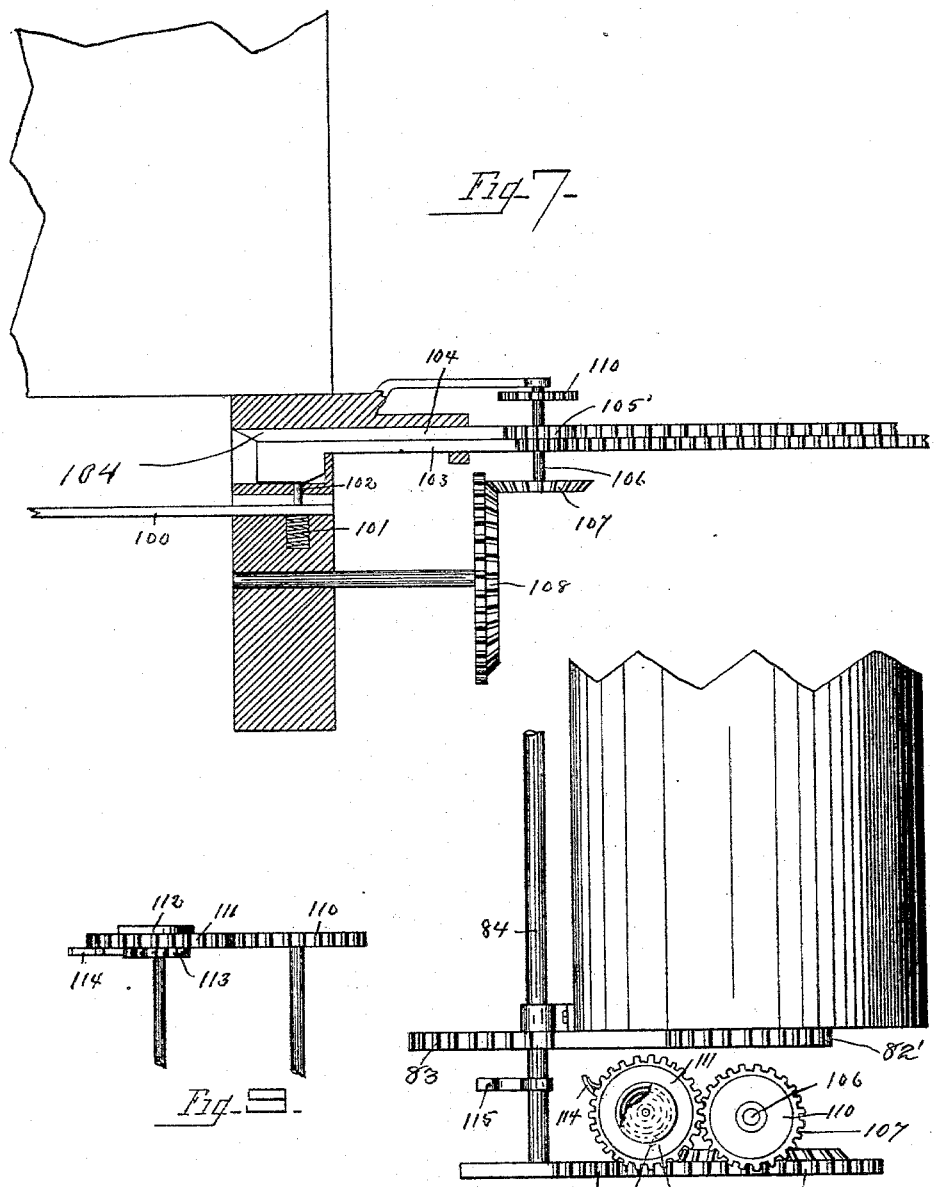
WITNESSES
Carolee J. Webster
Floyd R. Webster
INVENTOR
Erle V. Beals
By William Webster
Atty

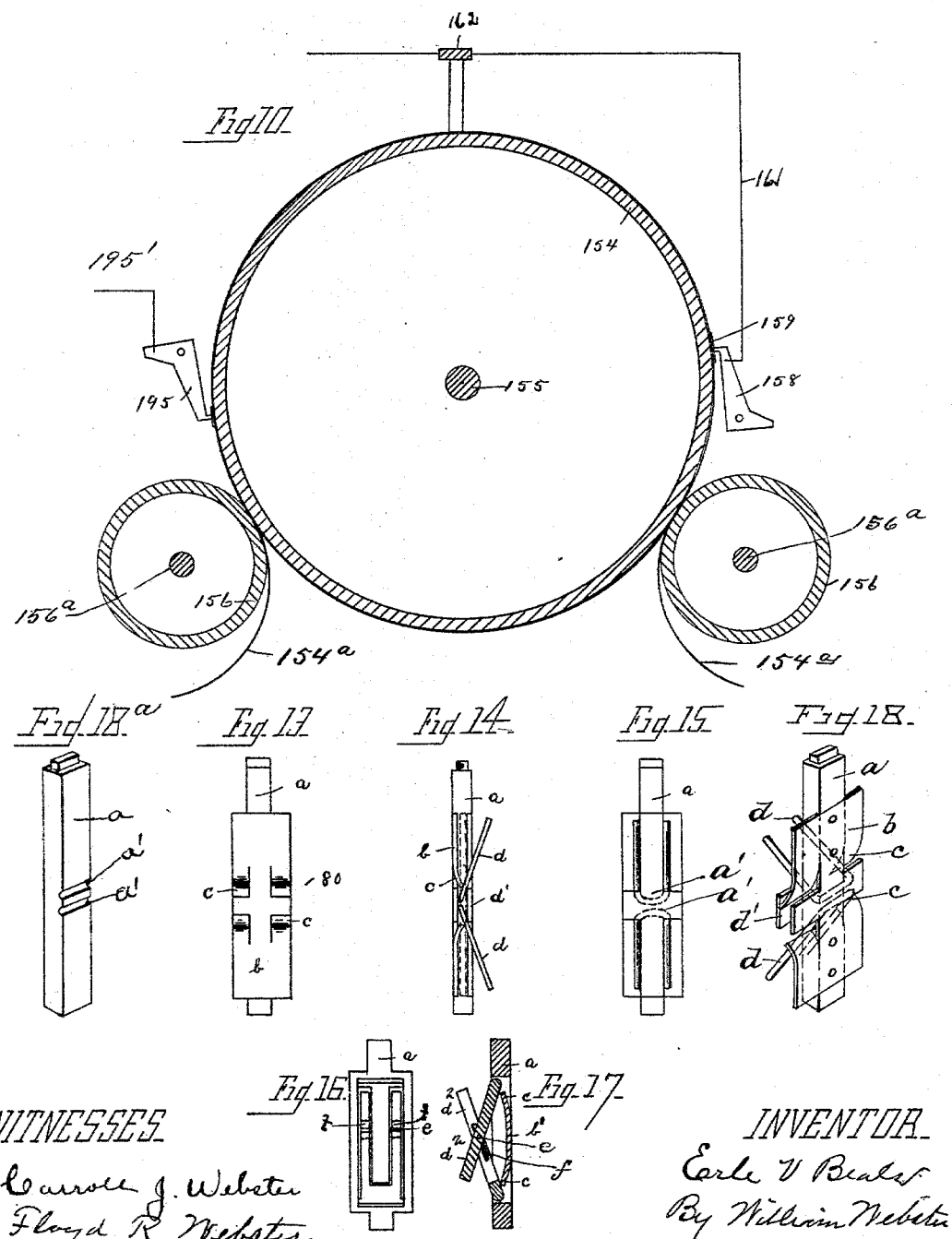

(No Model.) 10 Sheets—Sheet 8.
E. V. BEALS.
MATRIX MAKING MACHINE.
No. 490,263. Patented Jan. 24, 1893.
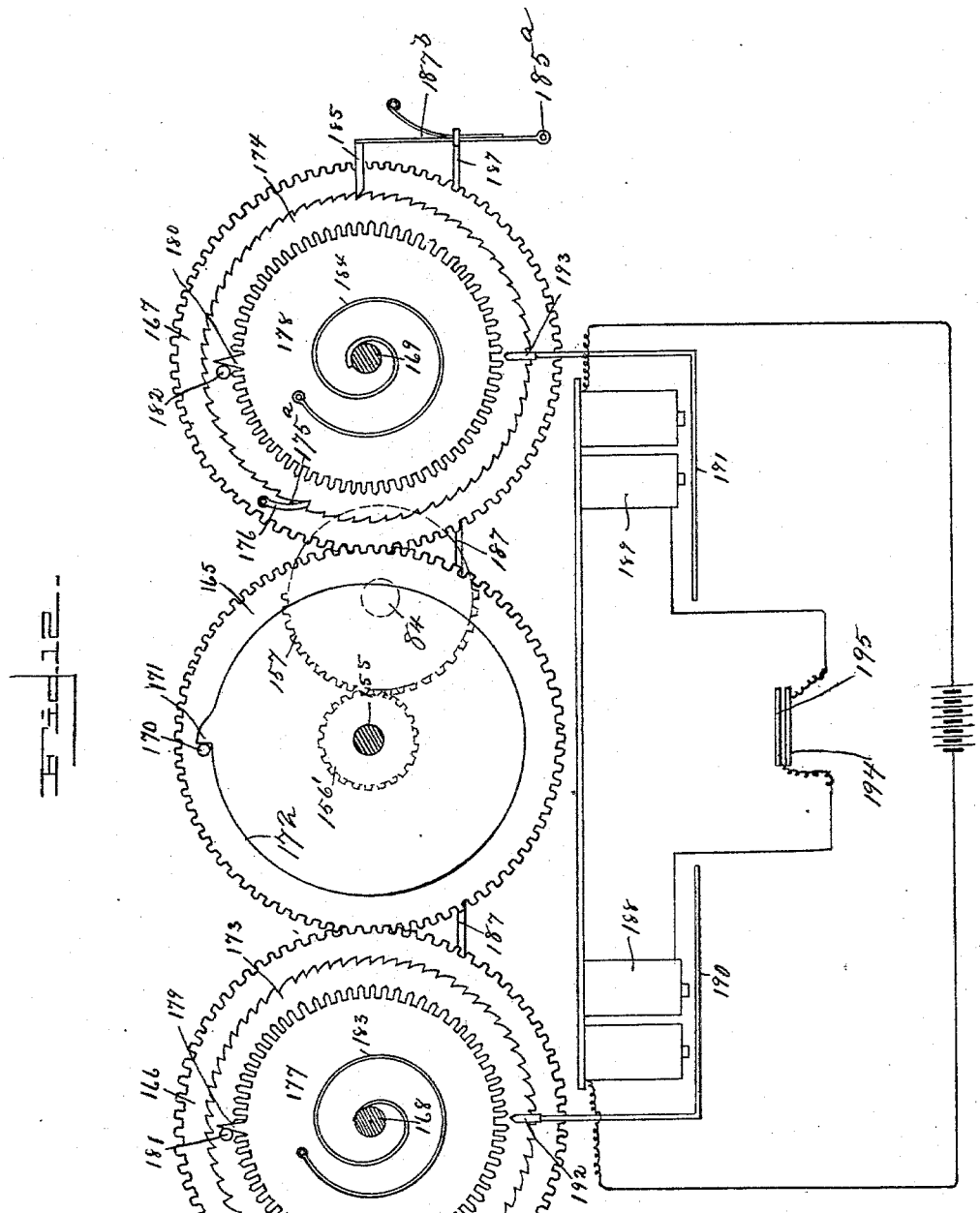
WITNESSES
Carroll J. Webster
Floyd R. Webster
INVENTOR
Erle V. Beals
By William Webster
Atty

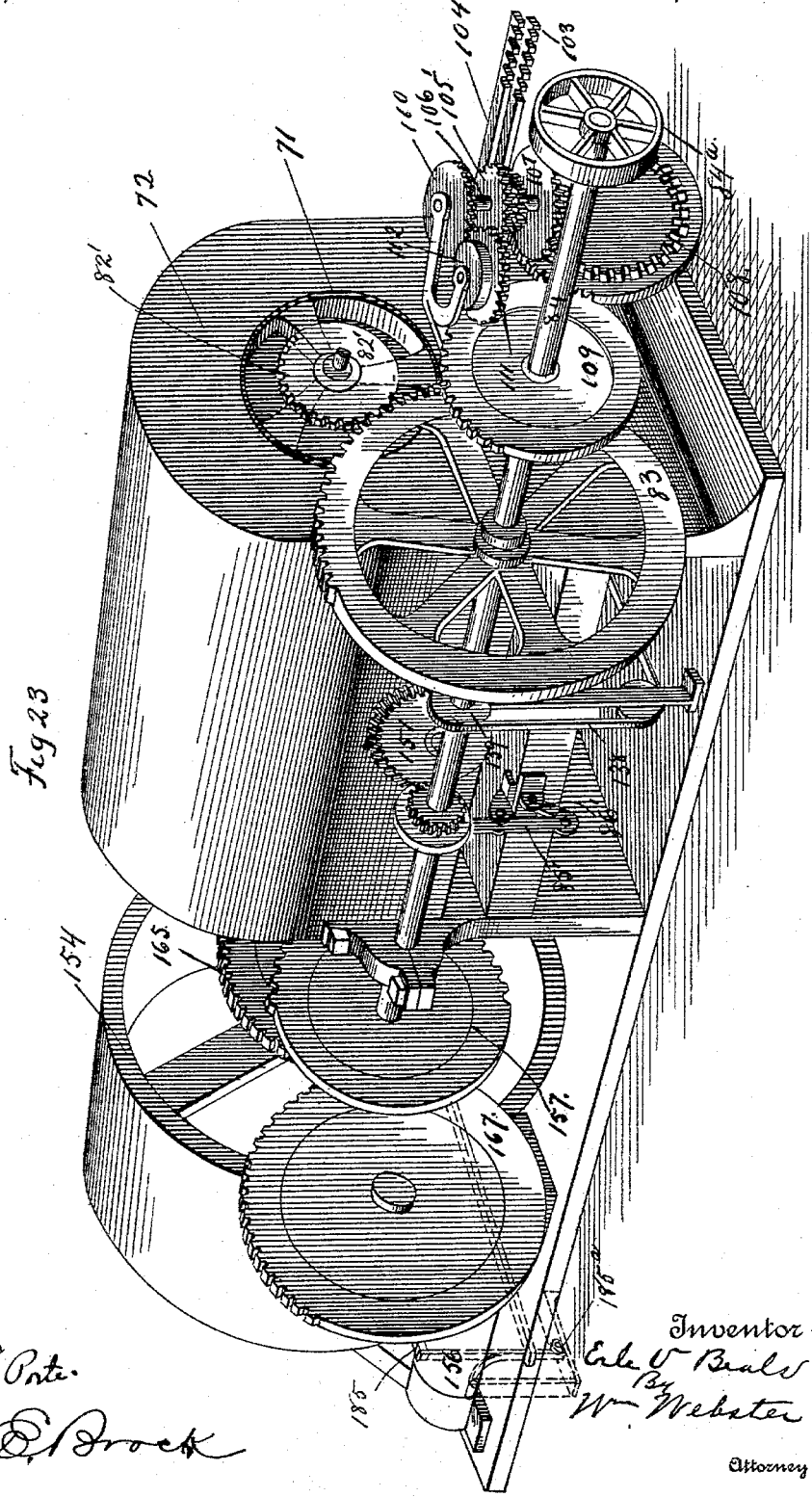

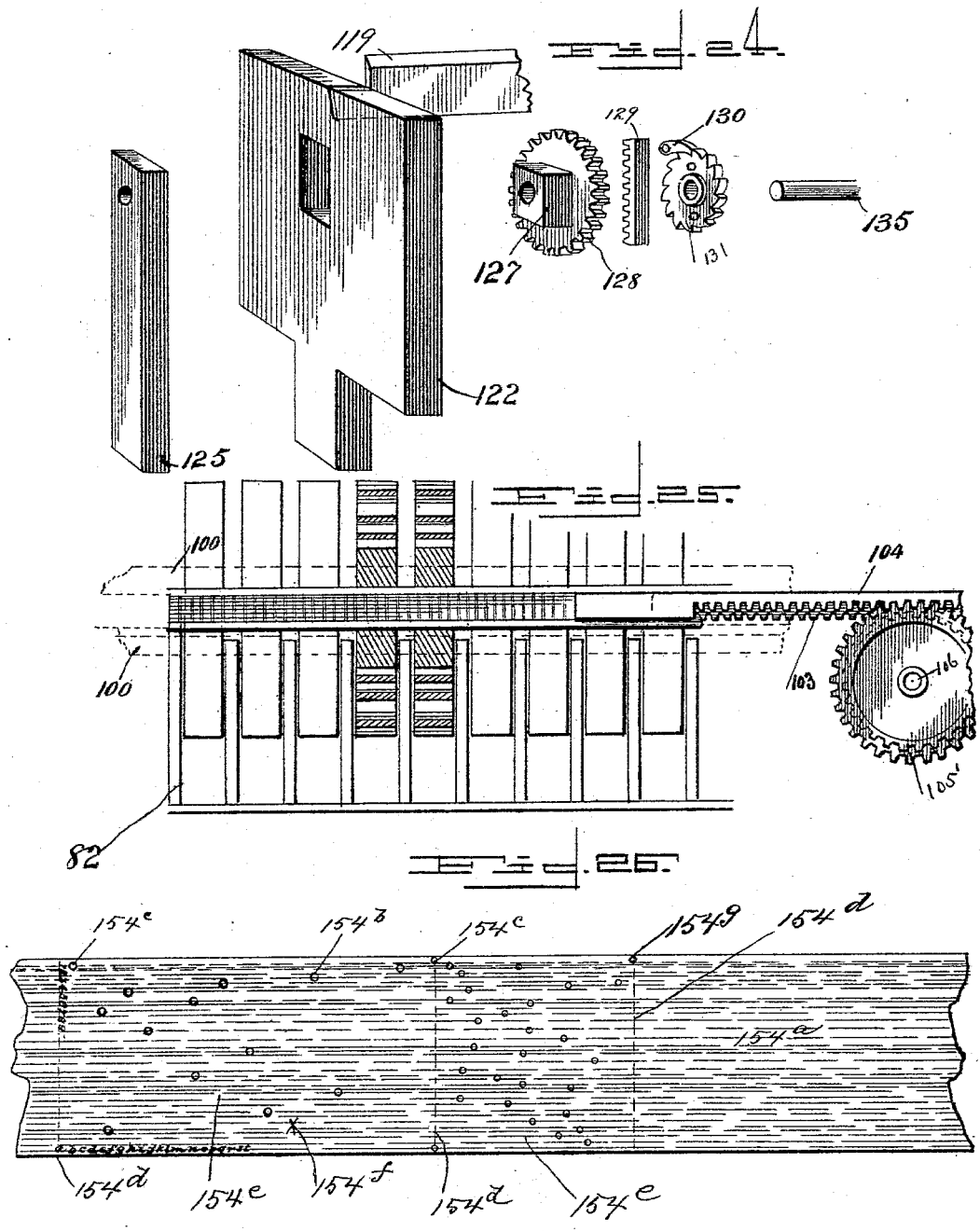

UNITED STATES PATENT OFFICE.

ERLE V. BEALS, OF MUSKEGON, MICHIGAN.

MATRIX-MAKING MACHINE.

SPECIFICATION forming part of Letters Patent No. 490,263, dated January 24, 1893.

Application filed May 18, 1891. Serial No. 393,109. (No model.)

*To all whom it may concern:*

Be it known that I, ERLE V. BEALS, of Muskegon, county of Muskegon, and State of Michigan, have invented certain new and useful Improvements in Matrix-Making Machines; and I do hereby declare that the following is a full, clear, and exact description of the invention, which will enable others skilled in the art to which it appertains to make and use the same, reference being had to the accompanying drawings, and to the letters and numerals of reference marked thereon, which form part of this specification.

My invention relates to a matrix making machine, and has especial reference to that class of machines, the object of which is to assemble the impression devices and make the impression automatically on paper or other substance ready to stereotype without necessitating the employment of the usual compositors, thereby rendering the process of setting type more expeditious and cheaper than heretofore.

Another object is to provide in combination with a strip of perforated paper, type-carrying rings having electrical communication with the perforated paper to revolve the same to cause the desired characters thereon to be in proper alignment.

A further object is to provide in combination with a strip of perforated paper, a feeding device for the paper, needles beneath which the paper moves forming electrical circuits through the perforations with type carrying rings, to stop the same and holding them in a fixed position while an impression of type is being taken.

A further object is to provide in combination with the perforations in the strip of paper, supplemental perforations, the object of which latter is economy of paper, and supplemental needles to operate a mechanism to regulate the feed of the paper to the needles that operate the type carrying rings to equal the amount of paper perforated.

A further object is to provide automatic electrically controlled type-rings, carrying type on its circumference, and means for straightening, lining and compressing the type automatically.

A still further object is to provide means for automatically making the impression of the type, after being lined. &c., on paper, ready to stereotype, and automatically moving the paper for the first impression.

A still further object is to provide specially constructed type; also spacing type which will automatically distribute themselves to fill a line of composition, both being designed to spring back to their respective type-carrying rings after the impression is made.

The invention consists in parts and combination of parts, hereinafter described and pointed out in the claims.

In the drawings, Figure 1 is a plan view of the reeling and impression device showing the manner of connecting the two when in operative position. Fig. 2 is the longitudinal vertical sectional view of the impression device, this view being taken on lines $y-y$ Fig. 1, showing the type-carrying rings and mechanism for operating the same. Fig. 3 is a longitudinal central vertical sectional view of the impression device, showing the type carrying rings, the mechanism for operating the plunger, and the mechanism for lining and straightening the type, this view being shown as the device is taking an impression. Fig. 4 is a sectional detailed view of a portion of the type-carrying rings, and a vertical central section of the mechanism for operating the plunger to make the impression. Fig. 5 is a horizontal section of the type-carrying cylinder, showing the vertical stop rods and arrangement of electromagnets to operate the same. Fig. 6 is a sectional detail view of the cylinder cap carrying rod, and non-conducting circular plate, showing the manner in which they are connected when in operative position. Fig. 7 is a vertical section of the frame, illustrating the loose rod, pusher, and straightener, and mechanism for operating the same. Fig. 8 is a plan view of the section of the compression device, showing more particularly the mechanism employed to return the loose rod and push-rod to place, and, Fig. 9 is a detailed view of the same. Fig. 10 is a sectional elevation on lines $z-z$ Fig. 1 illustrating the rolls employed for moving the perforated paper and needles which operate the type-carrying rings. Fig. 11 is a detailed view of the non-conducting circular plate and rods therein for connection with the liner. Fig. 12 is a sectional elevation on lines $a\,a$ Fig. 1 illustrating the paper saving device, this view being on an enlarged scale. Figs. 13, 14 and 15, are back, side and front, views respectively of the type, showing the levers and springs actuating the same, with check plates thereon, and Figs. 16 and 17 are rear and sectional views respectively of the spacing type. Fig. 18 is a perspective view of the type. Fig. 18ª shows in detail one of the type proper $a$. Fig. 19 is a top plan view of the pulp or paper carrying frame. Fig. 20 is a reduced detail view of the separating rings and slide gate which acts in connection therewith. Fig. 21 is a reduced detail view of the cylinder, showing the slot. Fig. 22 is a detail view of one of the type rings, showing a few types attached thereto, and Fig. 23 is a perspective view of the complete machine. Fig. 24 shows details in perspective of portions of the impression device detached from their assembled positions. Fig. 25 is a horizontal sectional view showing the type in alignment, and the mechanism for compressing them and also a sectional plan of the sliding gates 82. Fig. 26 is a section of the perforated paper used in the machine. Fig. 27 is a detail view of the mechanism for operating the pulp carrying frame.

Having described the views illustrating my invention, I will now proceed to describe the parts in detail, like letters and numerals of reference indicating corresponding parts throughout the several views.

71 Fig. 3 indicates an open metal cylinder, journaled at its opposite ends in end frame 72.

Around the outer surface of the circumference of cylinder 71 Fig. 2 is arranged a series of type rings 74, there being as many rings as there are possible letters and characters in a line of printed matter of known width. On the inner surface, and extending entirely around rings 74 is a number of cog projections 75, there being as many cog projections as there are letters and characters in composition. The exterior surface of the rings are formed with notches or recesses 76 for the insertion of posts 77. These posts are of equal distance from each other, and carry upon their ends, caps 78 Fig. 22 extending each side of the posts 77, forming channels 79 for the insertion of the type 80, there being as many channels 79 and consequently type 80 around the exterior of the rings 74 as there are letters and characters in composition.

The type being of peculiar and novel construction, I will now describe them in detail.

$a$ (Figs. 13 to 18.) indicates the type proper, each of which is formed with transverse grooves $a'$ intermediate its ends, and in said grooves are inserted the V shaped levers $d$, said levers being retained in place by means of an essentially cross-shaped check plate $d'$ secured upon one side of the type, while upon the other side is secured a back plate $b$ cut at $c$, and bent inward to normally press the wire levers outward, as clearly shown in Fig. 18. The back and check plates $b$ and $d'$ are set into the sides of the type flush with the same, and by constructing the levers and spring back plates as above described, it will be seen that types of any thickness can be held between the separating disks, hereinafter referred to, and yet when assembled to form words, will occupy only the place of the type proper, the levers being forced to one side of the type as shown in dotted lines. Fig. 14.

In Figs. 16 and 17 I have shown the spring spaces, it being understood that there is one in each type ring. In this construction the body of the block is cut away at each end leaving a central integral web portion $b'$, loose at its ends which free ends serve the purpose of a spring, and pivoted at each end of the cut out portions are the levers $d^2$, one U shaped the other T shaped, and arranged within the V shaped lever, said levers crossing each other, and are connected by means of a pin $e$, and in order to permit these levers to be compressed within the body of the space I provide one of the levers with a slot $f$, in which the pin $e$ slides. The ends of the integral web $b'$ bears normally upon the levers, tending to throw them outward, and after the pressure is removed, which compresses them, they will be immediately thrown outward as shown in Fig. 17.

It will be evident that I may employ the construction of the type heretofore described for the purpose of spaces by simply increasing the strength of their springs and removing the character on the end. In this construction the upper end of the type is left blank, and the springs are made stronger so as to cause the spacing type to fill up the space left at the end of the line.

The spring spaces are essential to the proper justification of the line, as it often happens that there is some space left at the end of the line. This space is filled by the spring spaces, which, having much stronger springs than the types, will force the type into proper position and justify the entire line.

81 Figs. 2. and 3 are thin separating rings, placed between the rings 74, the exterior edges of which separating rings extend outside the ends of the types and between which the type carrying rings revolve. Between the separating rings, and of a fraction more thickness than the type rings, are placed metallic spacing pieces 81', so as to allow the rings to have a free movement; also to prevent the interference of the types of one ring with the types of the adjacent rings. A lower section of each of the separating rings 81 is cut away at 81ª of a width equal to the length of a type, and in which slide gates 82 of equal thickness with the separating rings 81, and for the purpose of separating the types and confining them in their proper rings, after said types have been forced apart by the springs $d$ into approximately their proper positions. By cutting away the separating rings as shown at 81ª, all interference between the type moving to the assembling position and said rings is avoided, and the types are free to move from one end of the machine to the other.

To one end of the cylinder 71 Figs. 1, 2, and 3 is secured a cog-gear 82' which meshes with a mutilated pinion 83 on a constantly rotating main driving shaft 84. Mutilated pinion 83 is so timed that one revolution of it will revolve the cylinder a complete revolution and allow the same to remain passive until the next revolution of the mutilated pinion, the object of which will be described later on.

85 Figs. 2 and 3. designates a shaft fixedly secured in boxes on a bracket secured at each end of the cylinder 71, said shaft carrying a number of pinions 87, there being as many pinions 87 as there are rings 74, the pinions 87 meshing with the inner cogged surfaces of the rings 74 through slot or opening 88 Fig. 21. in the cylinder.

89 Fig. 2. designates a series of stop rods, which are in line with shaft 85, the upper ends of which rods are held up by springs 90 by which the stop rods are normally held from engagement with the pinions 87.

91 designates interior springs one end of each of which is secured to a pinion 87, the opposite end being attached to the shaft 85.

92 designates electro-magnets, the armatures 93 of which are pivoted to the inner side of the cylinder and are designed to depress the stop rods 89, when an electric circuit is closed, as will be hereinafter described.

In order to place the electro-magnets in the cylinder so that the armature 93 of each will be in direct line with the stop rod 89 which it is to operate, I place the electro-magnets in four rows, $92^b$ $92^c$ $92^d$ $92^e$, upon four shelves, $92^a$ the said magnets being arranged alternately as shown in Fig. 5, so that the first magnet of row $92^e$ acts on the first stop rod 89, the first magnet of the row $92^d$ acts on the second stop rod 89, the first of the third row $92^b$ acts on the third stop rod, the first of the fourth row $92^c$ acts on the fourth stop rod, and the second magnet of the row $92^e$ acts on the fifth stop rod, &c. I wish it understood that I do not limit myself to this construction, but may employ any arrangement, so that the magnets operate to depress separate stop rods.

94 Figs. 5, and 21 designates a rod of non-conducting-material, such as rubber, through which wires 95 pass and connect with the magnets 92, it being understood that there is a separate wire for each magnet.

96 Figs. 5 and 21 designates caps, placed upon the outer ends of the wires 95, outside of and against the rod 94, formed with a groove 97 for a purpose to be hereinafter described.

98 Fig. 5 designates a wire leading from the magnets to the center of the opposite end of the cylinder, where it is frictionally engaged through the interposition of an ordinary commutator 98' with a return wire 99, leading to the battery.

100 Figs. 2 and 3. designates rods extending the length of the device which are designed to compress the sides of the type and hold the same in a straight line while the impression is being made as will be hereinafter described. At each end of the rod 100 Fig. 3 and below the same, is a spring 101, the normal tendency of which is to raise the rods. On the upper side of the rods are pins 102 102', the pin 102 being adapted to contact with the head of pusher rod, 103, Fig. 7. while the pin 102' Fig. 4 is adapted to contact with a cam recess in the cylinder 71 for the double purpose of locking the cylinder from rotating and releasing the spring 101, and allows said spring to act upon the aligning rods 100.

103 designates a pusher rod which is adapted to be forced into the machine beneath the type rings by means of the pinion 105 meshing with the rack bar on said rod, said pusher rod passing through openings $81^a$ in the separating rings and compressing the types at the opposite end of the machine as already shown in Fig. 3.

104 Fig. 4, designates the bed or base rod which slides in slot $81^a$ formed in the separating rings 81, and serves not only to line the rings, but to form a common base for the type.

I will now describe the mechanism for operating the bed-rod 104 and push rod 103.

105' Figs. 7 and 23 designates a double pinion, one part of which meshes with a rackbar on the side of the bed-rod 104 and the other part of which meshes with a push-rod said double pinion being rotated with shaft 106, having at one end a bevel gear 107, which meshes with a combined bevel and straight gear 108, which meshes with the mutilated gear-wheel 109, Figs. 8, 23, on the main power shaft 84. On the opposite end of shaft 106 is the pinion 110, Fig. 9, meshing with a like pinion 111, loose on a shaft, carrying a cased spring 112, one end of which is attached to the shaft, the other end to the pinion 111. On the opposite side of the pinion 111. Fig. 9 and integral therewith is a ratchet wheel 113 having a levered pawl 114, bearing in its racheted recesses. The pawl projects in the path of travel of cam projection 115 on the main shaft 84.

116 Figs. 2 and 4 designates a shaft journaled in the frame and carrying in each end a double cam 117 and 118, operating respectively the knife 119, and the reversible plunger 120. Cam 117 has a cam face 121 which serves to hold the knife 119 in raised position against the paper or plastic substance through the medium of slide 122 running in slots in the frame during a partial turn of the shaft. Cam 118 is formed with two faces 123 and 124 which force the reversible plunger up against the paper or plastic substance through the medium of slide-rod 125, and the shaft carrying the reversible plunger, which is hung in boxes 127 in slots in the slide 122.

128 Fig. 2 designates a cog-wheel loosely secured to shaft 126 meshing with the rack bar 129 secured to a plunger 122. To the pinion 128 is a pawl 130, which bears against a ratchet wheel 131 integral with the plunger, so that as the shaft is raised the pawl allows the cog-wheel 128 to revolve free on its shaft, but as soon as the cam 123 or 124 acts to bring the shaft 126 up and consequently the reversible plunger, the pawl will engage the ratchet wheel turning the same and turning the reversible plunger, to cause the opposite face to bear against the paper. The reversible plunger is formed of two sides 132 and 133. On the side 132 is placed a rubber or soft buffer 134 for an object to be hereinafter described.

Shaft 126 is formed of a hollow bar 135, in the ends of which is inserted a gas-pipe, the gas from which escaping into the interior of the plunger through the perforations 136 is lighted to give heat to the metallic end of the plunger which is designed to remain over it all but a short space of time.

On the inner end of shaft 116 is a sprocket wheel 137, Figs. 4 and 20, over which runs a sprocket chain 138 Figs. 2 and 23 to a sprocket wheel 139 Fig. 1 on main shaft 84, and has a continuous revolution. On the outer end of shaft 116 Fig. 4 is a gear-wheel 140, meshing with a like gear-wheel 141, carrying on the outer end of its shaft a cam 142 for a purpose to be hereinafter stated.

143 Figs. 2 and 19 designates end pieces and 144 and 145 designate respectively side pieces of a frame carrying the paper 146, on which the impression is made. Side rod 145 is threaded and runs through threaded nut 147, Figs. 3 and 4 which revolves between the sides of the hanger 148, the outer circumference of which is cogged, and meshes with cog-gear 149 on shaft 150, the opposite end of which carries a bevel gear 151 Fig. 1. meshing with mutilated gear 152 on main shaft 84, through the combined straight and beveled gear 153. The paper 146, Fig. 19 is stretched tightly over the end pieces 143 of the frame, and clamped thereto, by means of clamp bars 143ª and screws 143ᵇ, and after one column has been impressed in the pulp, the strip so impressed is removed and a new one is clamped to the frame as just described.

I will now proceed to describe the manner and mechanism for controlling the electromagnets through the medium of the perforated paper a detail view of a section of paper being shown in Fig. 26, said paper being specially prepared, by means of a perforating machine, for which I have made an application for patent dated March 25 1892. Serial No. 426,359.

154 Figs. 1 and 10 designates a roller loosely mounted on shaft 155, there being two smaller rollers 156, journaled upon the shafts 156ª mounted within the frame of the reeling device, one on each side and between which and the large roller the perforated paper is moved. On one end of the shaft 155 is a cog-wheel 156' which meshes with a mutilated cog-wheel 157 on main shaft 84, the wheel 156' being designed to make a one-half turn as the wheel 157 makes a complete revolution. At one side of the roller 154 are a number of needles 158 Fig. 10 which rest normally upon the paper and below which and between the paper and roller is a strip of conducting material 159 connected with wire 160 leading to the battery. Connected with each of the needles is a wire 161 leading through a cross piece 162 above the roller and connected with wires 163 set in the non-conducting circular plate 164, Fig. 4 which wires 161 bear against the caps 96 and complete the circuit from the conducting strip 159 and consequently from the battery to the electro-magnet 92 Fig. 5.

165 Figs. 1 and 12, designates a cog-wheel loosely mounted on shaft 155 and meshing with cog-wheels 166 and 167 loosely mounted on shafts 168 and 169 respectively. Cog-pinion 165 is provided on its inner face with a pin 170 which in its normal position rests against cam projection 171 on cylindrical projection 172 of cylindrical roll 154.

173 and 174 designate disks mounted securely on shafts 168 and 169, journaled to the reeling frame and independent of rolls 156, and in the notches of 174 rides a catch 185 for purpose as will be hereinafter described.

175 and 176 are pawls attached to cog-wheels 166 and 165 respectively, and play in a single notch 175ª in the edges of disks 173 and 174.

177 and 178 designate toothed disks, movably mounted on shafts 168 and 169 respectively, on the outer periphery of which are projections 179 and 180 which normally rest against pins 181 and 182 respectively, by reason of springs 183 and 184, one end of each of which is attached to a shaft 168 and 169 respectively, the other end of which spring is attached to a disk 177 or 178.

185 designates a spring catch, pivoted to the side of the frame at 185ª and is designed to bear in the toothed periphery of the ratcheted disk 174, it being understood that there are as many tooth projections on cog-wheels 166 and 167, ratcheted disks 173 and 174, and tooth disks 177 and 178 as there are letters and characters in composition.

187 designates a longitudinally moving bar bearing against the spring catch 185 and having at the opposite end a rectangular bearing 187ª, on which the cam 142 revolves and throws the rod outward, said catch being thrown inward by means of a spring 187ᵇ.

188 and 189 designates electro-magnets Fig. 12 the armatures 190 and 191 of which are provided with catches 192 and 193 respectively, which, when operated, rise in between the teeth of tooth disks 177 and 178.

194 and 195 Figs. 9. 10 and 12 designate needles bearing against the roller 154 at the opposite side to that occupied by needles 158, the wires of which needles 194 and 195 connect with magnets 188 and 189.

In operation, the reeling device and the assembling device both, are operated synchronously by the shaft 84 Fig. 1 through an ordinary belt pulley 84ª at one end. The teeth of the mutilated gears 83 and 157 are in the same arc, of a circle, with shaft 84 for its center. The purpose of this, is that no part of the perforated paper in the reel shall be reeled, beneath the electric needles, without a relative and corresponding movement of the cylinder 71. The only instance in which these movements do not occur together, as just stated, is when supplemental perforations controlling supplemental electric needles 194 and 195, are employed, for the purpose of saving paper. These movements are intermittent, while the movement of the shaft 84 is constant; the cylinder and reel pausing after each interval of motion while the type are being assembled, aligned and the impression made. The type rings on cylinder 71 are all, or as many as there are characters and spaces, used in the composition of the line to be assembled, actuated during the single revolution of said cylinder, and independently of each other. This is done through shaft 85, small gears 87, the electro magnets 92 and the stop rods 89, there being as many magnets, and gears 87, as there are type rings. All instruments inside the cylinder 71 revolve with the same. The shaft 85 has bearings in brackets in the cylinder's ends. Gears 87, but for their interior springs 91, would be idle upon the shaft 85. These gears pass through slot 88 in cylinder and mesh with and control the type rings 74. The first gear 87ª Fig. 3 has no interior spring and is rigid upon this shaft 85. The first corresponding ring 74 has no type in its periphery, and is rigidly connected to that part of the frame, which surrounds and constitutes the bearing of cylinder 71. By these rigid connections, shaft 85 is kept in constant, true relation with the type rings. The cylinder moves from left to right, and shaft 85, carried with it by its end bearings, describes a circle within the cylinder, and is also rotated upon its own center, by the fixed single gear 87ª and ring 74, above mentioned. Springs 91 are so connected within gears 87, that they are always under tension and tend to drive the type rings in the opposite direction from that in which cylinder 71 is revolved by the motor shaft 84. When the cylinder is at rest, and the type rings are in their normal positions, each of the springs 91 is under slight tension, and this slight tension is resisted alone, by check posts 74ª against permanent rod 74ᵇ which runs entirely across the type rings. This check rod 74ᵇ Fig. 2 is arranged beneath the type rings and extends from one end of the machine to the other, its ends being rigidly connected with said frame. There is a check post 74ª on each type ring, said type post projecting farther outward than the type and is adapted to contact with check rod 74ᵇ; while the type are of such a length that they will pass freely by this rod without striking the same. As cylinder 71 revolves, the type rings are undisturbed, but maintained, rather, in their normal positions by the slight tension of springs 91 above mentioned, until by electrical connections, stop rods 89 are thrown into the teeth of gears 87 at this point, no matter at what point of the circle it may be, the type ring becomes locked to the cylinder, through the mesh of gears 87 in the type ring 74, and is carried around the remaining distance of the cylinder's revolution. At the end there assembles whatever type there may have been directly opposite the various points of the circle during the electrical action. What is true of one gear 87 with type ring 74, is equally so with all other gears 87 and rings 74, except the fixed end ones aforesaid and applicable to any degree of the circle, determined by the actions of the magnets 92. The actions of these magnets may be all at one time or consecutively, but can only act once during each revolution of the cylinder. At the conclusion of this revolution all the various characters are brought into the impressing line. The type are all brought in alignment at once in the following manner: It being understood that the characters are arranged on the type rings according to the frequency of their use, the characters least employed being nearest the starting point of the cylinder, and it will be further understood that the characters least used are selected and operated upon first and all of like characters at the same instant, no matter what relative position they may occupy in the finally assembled line. As the cylinder 71 revolves, the ring or rings first locked to the cylinder by stop rods 89 and gears 87, are carried around with the said cylinder. The locking of ring or rings next desired takes place while the ring or rings first locked are being carried around, and at a time when the locked point of the ring or rings first locked, reach the locking point of the ring or rings next locked, by the rods 89 and gears 87 under control of the electro magnets 92. This brings the desired type of the first locked ring or rings into alignment with the desired type of the next locked ring or rings, and this operation is continued during the remainder of the revolution regarding the other type to be aligned so that at the conclusion of the revolution all of the type selected are brought at once into the final alignment. At this time the openings in the thin separating rings 81, between the type rings, which keep the type of one ring from interferring with those of its neighbors, are opened by the drawing of the gate 82, and in the groove way, thus formed lengthwise through the rings, the type are compressed at one side of the machine, to the width of a printed column, by the mechanism covered by Figs. 3 and 7, comprising the push rod 103 and the base rod 104. as explained hereinafter.

Over the lower ends of the type thus aligned, but before the action of compression, sharp edged rods 100, are moved longitudinally into position alongside of the type forming a smooth and even pathway for the same. The uncompressed type with levers expanded, just fill the distance from the left side of the machine, (Fig. 3) to the point toward the right at which the last type ring used in that line of composition stands. The type rings are of equal thickness, and so are all type while their levers are expanded. The compression rod 103 destroys this equality in thickness and compresses them body to body, according to their natural and varied thicknesses, long since established in the art of printing. We now have the type assembled, aligned, and compressed, and are ready to transfer and fix their faces in stereotyping material, and this as follows. Beneath the compressed line, and in a path at right angles to the compressing rod 103, travels in suitable guides a strip matrix board on the frame 144 Fig. 2. On the side of this, opposite the type, is the revoluble plunger 120, Fig. 4. having two surfaces diametrically opposite each other, one being a soft buffer substance, the other a smooth metallic piece. These two surfaces are intended to be presented against the matrix board or that part of it which comes in contact with the compressed type, alternately, the buffer first. This plunger, 120, revolves upon a hollow non rotatable shaft 126 during the upward movement of the slides 122, through the medium of ratchet wheels 131, pawls 130, gears 128, and rack bars 129, and is accomplished as follows: Ratchet wheels 131 are rigid with the ends of plunger 120, and are loose on hollow shaft 126; pawls 130 are fastened to the side of gears 128, which are free to turn on shaft 126, and in constant mesh with rack bar 129 which are secured to the slide or sliding frame 122. This slide or frame 122 and slides 125 are moved up by single faced cams 117 and double faced cams 118, respectively, which cams are mounted upon a shaft 116 and driven constantly by a chain belt 138 Fig. 2 upon shaft 84, said belt passing around a sprocket 137. (Fig. 3.) The cam movement of frame 122 precedes that of the first face of 118, and imbeds the upper edge of the blade 119 in the pulp close beside the line of type. The first faces of cams 118 then raise slides 125, which carry upwardly shaft 126, upon which plunger 120 revolves. The buffer substance 134 will be uppermost on the plunger, and as these first faces of cams 118 actuate the slides 125, this buffer substance strikes the pulp below the line of compressed type and embeds a portion of said pulp firmly in the faces of said type. After this action, slides 125 with plunger 120 are thrown downward by springs 201ª. The first faces of cams 118 having performed their work while the single faced cams 117 are still holding the blade 119 against the pulp, the second faces of cams 118, again force slide 125 and plunger 120 upward, this time presenting metallic surface 133 against the pulp. During this second movement of the slide 125 gears 128 on shaft 126, are carried upward on the rack bars 129 in the slide or frame 122, and this upward movement on rack bars 129 gives gears 128 a rotary motion from left to right. Fig. 21. As has been stated, gears 128 carry pawls 130 on their sides, and these pawls engage the ratchets 131 which are integral with plunger 120. By this pawl and ratchet the rotary motion of gear 128 from left to right is transmitted to plunger 120, which is in turn revolved a half revolution until the left lower corner of the plunger strikes against blade 119, at which moment the highest rise of the second face of cams 118 is given plunger 120 and the matrix is made. The second faces of cams 118 complete their work while cams 117 are still acting, and springs 201ª again force down slide 125 and plunger 120. In this downward movement, gears 128 are revolved from right to left, but their revolutions in this direction do not affect plunger 120, since the pawl 130 is then sliding over the ratchet wheel teeth. The last movement of this whole mechanism terminates with the passing of cams 117 from beneath the slide 122, which are then pulled down by spring 201. Inside of plunger 120, are gas jets 136, fed by gas through the hollow shaft 126, the purpose of these being to keep heated the metallic surface 133 to set or dry the matrix, said metallic surface remains over said flames all but a very short time, when the buffer surface 134 passes over. After the actions of impression just described are completed, frame 144, carrying pulp, or matrix board 146 is moved lengthwise a distance equal to the thickness of a line of type, by screw 145, compound nut and gear 147, gear 149 and bevel gears 151 and 153. The screw 145 which constitutes one side of this frame 144 turns in the compound nut and gear 147 which has bearings 148 on the frame of machine. The shaft 150 with pinion 149 on one end meshing with nut and gear 147, extends to the motor shaft 84 and there communicates with it through bevel gear 151 and mutilated bevel gear 153 on said motor shaft. The purpose of these mutilated gears is to give intermittent motion to screw 145, said motion occurring after each impression.

We have now succeeded in assembling a line of characters in alignment compressing them and taking a matrix from them. It remains now to get the type and other mechanisms back to their initial places. The first step toward this end is the liberating of the type by withdrawing the compressor rod 103 and base rod 104. This action is started by arm 115 Fig. 8 striking pawl 114, which releases spring 112, which, in turn drives pinion 110. Pinion 110 has on its shaft two gears of unequal diameters, which mesh with two rack bars (Fig. 7.) one on compressor rod 103, the other on base rod 104. The purpose of their unequal diameter is to give increased motion to the base rod 104 which leads pusher rod 103 in compressing the type and also in releasing them. As the compressor rod 103 and base rod 104 were forced into the cut out portion 81ᵃ of the rings by means of the mutilated gear on the motor shaft 84, the spring 112 was given the tension which is now used in turning pinion 110 back in the opposite direction to withdraw the rods 103 and 104. As these two rods are withdrawn, the type, by virtue of their springs and levers, expand to equal distances, and when at rest stand approximately in the plane of their respective type rings, (which have not been moved since the assembling was done) and are finally separated exactly into the rings by means of a series of gates 82, which are operated by the lever 85' and link 86, said lever 85' being operated by an eccentric on motor shaft 84. Following this action the stop rods 89 are raised by lever 203 striking on pins 203', and freeing the gears 87 whose internal springs 91 being then at liberty react on the type rings 74, and at once return them severally to their normal position, which is determined by check-post 74ᵃ and rods 74ᵇ. We now have all the parts back to their original places ready for the assembling of a new line, and it remains only to show how the mechanism described is controlled electrically by the perforated paper in the reeling device.

The perforated paper comes to the reel in the form of a roll.

The method of perforating the paper which controls the assembling of the type in the assembling line, is indicated in Fig. 26. The perforations are on certain imaginary lines which for the sake of convenience have been indicated by real lines in said figure. 154ᵈ indicates base lines, extending across the paper. 154ᵉ indicates lines extending longitudinally of the paper. There are as many lines 154ᵉ as there are type rings. The lines 154ᵉ between each pair of base lines have a point 154ᵇ for each character on each of the type rings, which rings are all provided with the same characters in the same order. For instance, if the point C were perforated in the first line 154ᶜ the letter c in the first type ring would be brought to the assembling line when the paper was placed in the reeling device. All the perforations between two base lines are necessary to bring a single line of type to the assembling line. As explained, to bring all the characters to the assembled line, it is necessary to reel off all the paper between two of the imaginary base lines, and it is manifest that if all the different characters in the machine should happen to be used in one line, that the maximum length of paper between the base lines would have to be used, because the first and last perforations in the longitudinal lines, representing the first and last characters used, would be necessary. If, however, it should happen that the first part of the paper that would be reeled contained all the perforations necessary to assemble the line desired, it would be a great saving of paper to stop reeling when, the perforations in the paper had all passed beneath the needles. To accomplish this purpose two marginal perforations are automatically made in the paper by the perforator claimed in my case referred to. These two perforations 154ᵉ and 154ᵍ. pass beneath the needles 194. and 195, alternately, which operate the magnets 188 and 189 controlling the disk mechanisms as hereinafter explained.

The amount of paper reeled in one interval is the distance from one base line to the next adjacent base line, which distance varies with nearly every line. The means of varying the reeling mechanism for each line is shown in Fig. 12, which mechanism is controlled by supplemental magnet 188, 189 and supplemental needles 194 and 195 (Fig. 10.), which operation is as follows: The perforated paper is first reeled past the electric needles by mutilated gear 157 meshing with pinion 156' which is rigid with shaft. 155 carrying gear 165 provided with pin 170 which engages the shoulder 171 on the projecting portion 172 of roll 154. We will suppose the section of perforated paper to be reeled is less in length than if the last letters of the alphabet had been used; in which case the disk retaining mechanism at the left of Fig. 12 will be brought into play. While the gear 157 is turning gear 156', a marginal perforation 154ᶜ in the paper [which is automatically made in definite position by my separate perforate machine before referred to] passes beneath the supplemental needle 195, operating magnet 189 and catch 192. This stops the rotation of disk 177 which is loose on shaft 168, though its spring 183 is fastened to said shaft. The mutilated gear 157. also rotates cog disk 166 and ratchet disk 173 by gear 165. and this after the rotation of disk 177 has been stopped. This disk 177 unchecked, would by its spring connection with shaft 168 have revolved with disks 166 and 173. During the motion of mutilated gear 157 after the stopping of disk 177, pin 181. will, by means of pawl 175. on gear 166. engaging in notch 175ᵃ on disk 173, be moved to the left, away from pointer 179. Now, inasmuch as ratchet disk 173 is rigid with shaft 168. spring 183. [one end of which is fastened to disk 177] is given tension by this continued motion of gear 157 after the stopping of disk 177 by catch 192. In the course of its revolution the plain face of gear 157 is presented to pinion 156', giving freedom to said pinion, the tension now of spring 183 on shaft 168 reacts, and by disk 173, pawl 175, and gears 166 and 165, revolves pinion 156'. in an opposite direction exactly equal to the distance which it was driven by gear 157 after catch 192 was operated. In the reverse motion produced by said spring, the pin 170 is carried, to the left, away from the shoulder 171. The distance it is carried back from said shoulder is proportional to the amount of unused paper which would have been used, had the last letter in the longitudinal line been used in the series of perforations then being reeled. Catch 192 is retained in the tooth of 177 by friction of spring 183. Consequently as soon as this backward movement is effected and the spring has spent itself catch 192 will drop to its normal position. As the teeth of gear 157 again mesh with pinion 156'. [gearing 157 turning from right to left] gear 165, with pin 170 is moved forward, again a distance equal to the reverse movement just described, before pin 170 [which was removed from shoulder 171 by said reverse movement] again contacts with shoulder 171. During this movement forward roller 154 remains, stationary but begins to revolve when pin 170 strikes the shoulder 171, in consequence of which no perforated paper is reeled beneath the needles 158 until the pin contacts with the shoulder. But while the pin 170 is moving toward 171, cylinder 71, carrying the type rings is revolved, since the mutilated gear 83 (Fig. 23) drives said cylinder forward from the actual start, it being understood the teeth on 83 and 157 are in the same arc.

The mechanism shown at the right of Fig. 12 which operates alternately with that just described, is identical with that shown at the left, with the exception of the catch 185 on rod 187. This mechanism is necessary from the condition which exists when the length of perforated paper used is less than half the distance between two base lines removed from each other the full possible distance:—that is, to say, if all the letters of the alphabet were used. Under these conditions the mechanism of the lift is still operating when the second marginal hole controlling the right hand mechanism comes beneath needle 194. At this time the teeth of mutilated gear 157 are still in mesh with pinion 156'. By the time the last tooth of gear 157 is about to leave pinion 156'. then the spring 184 has been given some tension in the same manner as spring 183 as before described. At this point, catch 185 by means of spring 187ᵇ, is held in engagement with ratchet disk 174. The next instant gear 156' is released, and is thrown back by spring 183 as before described. But under the present conditions this backward movement of gear 165. throws gear 167. from left to right. By virtue of catch 185. this motion of 167 has no effect upon disk 174. or disk 178. Gear 167, however, goes to the right a distance equal to the reverse movement of gear 165. It will be seen at this time that the tension given spring 184 since its controlling needle 194 met its marginal perforation has been preserved. Now as the gear 157. again throws pinion 156' ahead and while pin 170 is moving toward 171 gear 167 is being turned back to the left as far as it was previously moved to the right, so that, when pin 170 reaches shoulder 171 gear 167 by its pawl 176, in notch 175ᵃ is just ready to give further tension to the spring 184, the teeth of ratchet disk of 174. sliding past catch 185. By the time gear 157. again releases pinion 156'. the spring 184 has been given tension sufficient and just as if it had not been interrupted by the reverse motion of gear 167. When mutilated gear 157. does release 156'. catch 185 is thrown out from ratchet disk 174 by means of rod 187. lug 187ᵃ and cam wheel 142 upon shaft 164. As soon as this action takes place the right hand mechanism by spring 184 throws pin 170 away from shoulder 171 in precisely the same manner as the left hand mechanism did. The friction being removed from catch 193. it drops from engagement with the toothed disk 178.

The paper is fed between the large roll 154 and the small rolls 156, and over, the upper surface of roll 154, as has been stated. Roll 154 and cylinder 71 revolve together, and as 154 revolves the perforated paper is carried with it between the electrical needles 158 and conducting material 159, bringing the perforations at different degrees of the revolution between the needles 158 and conductor 159. The paper itself breaks the contact between the needles 158 and conductor 159, and it is only when the holes in the paper come before the two points of contact, that the electro magnets in side of cylinder 71 are actuated through the connections 161 between them and the needles.

There is a needle for each magnet and each magnet controls only its particular type ring. A perforation in the paper to actuate the first magnet in the cylinder 71 must be drawn under the first needle 158, and the character that this hole represents depends entirely upon the instant in the revolution of cylinder 71 and roll 154, when this hole comes before the needle and conductor, or what is the same, its distance from the imaginary base crosswise of the paper. What is true in respect to this first needle is equally true with every one of the entire row, they may all act at once or consecutively.

What I claim is:—

1. In a matrix making machine the combination with a reeling device, carrying a strip of perforated paper and a series of electric needles of type rings carrying justifiable type and electrically controlled and connected with the needles of the reeling device.

2. In a matrix making machine, a type having laterally projecting levers, and springs for operating the levers whereby the types are expanded to their normal position after pressure is relieved.

3. In a matrix making machine, the combination with the type carrying rings of the aligning rods, 100, the base rod 104 and compressor rod 103, the base rod moving parallel with the compressor rod and farther than the same.

4. In a matrix making machine, a cylinder, type carrying rings surrounding the same, in combination with a shaft mounted in the cylinder carrying cogged disks meshing with the type carrying rings, said cogged disks being controlled electrically through the medium of a strip of perforated paper.

5. In a matrix making machine, type carrying rings having justifiable type, a reeling device electrically controlling the said rings, a shaft mounted below said rings and having mounted thereon cams controlling impression devices to make an impression for stereotyping.

6. In a matrix making machine, electrically controlled rings carrying detachable justifiable characters, and means for taking an impression therefrom.

7. In a matrix making machine, a cylinder, a plurality of rings mounted thereon carrying justifiable type symbols, posts between the type symbols forming channels, in combination with a compression device adapted to hold the type assembled while the impression is being taken.

8. In a matrix making machine, a main shaft actuating a cylinder carrying on its circumference a plurality of rings, carrying detachable justifiable types in combination with a roll actuated by the shaft, carrying perforated paper, needles adapted to coincide with the perforations in the paper, and electrical connections between the needles and type carrying rings.

9. In a matrix making machine, a series of rings carrying detachable justifiable types, a main shaft, a counter shaft and connections therewith, cams on the counter shaft operating the impression devices of paper or plastic substance ready to stereotype.

10. In a matrix making machine, a plurality of rings carrying justifiable type symbols, bars for lining the type, a base rod, and mechanism for compressing the type prior to making an impression ready to stereotype.

11. In a matrix making machine, a plurality of rings carrying posts forming channels, type symbols placed in the channels and adapted to be compressed together, springs on the type symbols which allow them to automatically distribute in the channels in their respective rings.

12. In a matrix making machine, a reel having electric needles adapted to control by means of a perforated strip of paper, type rings with which they are connected; and supplemental needles adapted to be operated also by the paper to regulate the feed of said reel to the first mentioned needles.

13. In a matrix making machine, a strip of perforated paper and intermediate electrical connections with type carrying rings, a shaft operating impression devices, a paper or pulp automatically fed between the line of type and impression devices, and means for drying the same automatically.

14. In a matrix making machine, a strip of paper and intermediate electrical connections with rings carrying justifiable type to line the same, a frame one side thereof running in a threaded nut revolved by intermediate connections with the main power shaft, and paper or pulp on said frame, in combination with a plunger located beneath the paper to make an impression and heat the paper ready to stereotype.

15. In a matrix making machine, a cylinder having on its outer circumference a plurality of type carrying rings, in combination with a plurality of cogged disks meshing with the type carrying rings, electro-magnets, the armatures of which operate stop rods contacting with the cogged disks, and intermediate electrical connections with the needles of the perforated paper reeling devices.

16. In a matrix-making machine, a strip of perforated paper, needles to coincide with the perforations, wires connecting a circular disk, in combination with a cylinder carrying a plurality of type carrying rings, cogged disks engaging with the rings, stop rods engaging with the cogged disks, and electro-magnets the armatures of which engage the stop rods and wires connecting the electro-magnets and wires in circular disk.

17. In a matrix-making machine, a plurality of revoluble rings, justifiable type symbols carried by the rings, electrical connections for causing the rings to revolve and bring the desired type symbols into alignment, and means for compressing the type symbols into the desired space.

18. In a matrix making machine, a plurality of revoluble rings formed with recesses on their peripheries, type symbols carried by the rings, each type symbol being removably held in the rings and formed with springs upon the side to properly space, and afterward return the same.

19. In a matrix making machine, a cylinder, a series of type carrying rings encircling the same, and having cogs on their inner sides a gear intermeshing with cogs formed upon the inner side of the rings, and electrical connections for locking the gear from revolution.

20. In a matrix making machine, a series of rings, carrying justifiable type, means for controlling the same to cause the desired type to align, a reversible plunger, and mechanism for moving, a plastic substance between the type and plunger.

21. In a matrix making machine, a series of rings, carrying justifiable type, means for controlling the same to cause the desired type to align, a plastic substance beneath the type, and a plunger provided with means for heating and raising the same to form and dry matrices from the type.

22. In a matrix making machine, a reeling device comprising a cylinder revolubly mounted upon a shaft, a toothed ring upon the cylinder, projections upon the ring and cylinder to cause the same to move in unison, a toothed disk intermeshing with the ring and provided with a pawl, a ratchet disk in engagement with the pawl, a toothed spring controlled disk formed with a projection, a projection upon the ratchet disk in engagement therewith, an electrically controlled catch adapted to be projected into the teeth of the last named disk.

23. In a matrix making machine, a vertically movable, reversible plunger, carrying a heating device, one end of said plunger being compressible, while the opposite end is of rigid metal.

24. In a matrix-making machine, an automatic assembling device, consisting of a series of revoluble carriers provided with detachable justifiable types, said carriers being electrically controlled by a perforated sheet the construction being such that all the types of the same character are simultaneously selected and the types of different characters successively collected all of said type being brought into final alignment by a single revolution of the carriers.

In testimony that I claim the foregoing as my own I hereby affix my signature in presence of two witnesses.

ERLE V. BEALS.

Witnesses:
CHAS. D. LONG,
GEO. S. HOSMER.